(12) United States Patent
Nahas

(10) Patent No.: US 9,309,155 B2
(45) Date of Patent: *Apr. 12, 2016

(54) POWDER COMPRISING CERAMIC GRANULES AND LOW TG BINDER

(75) Inventor: Nabil Nahas, Serris (FR)

(73) Assignee: SAINT-GOBAIN CENTRE DE RECHERCHES ET D'ETUDES EUROPEEN, Courbevoie (FR)

(*) Notice: Subject to any disclaimer, the term of this patent is extended or adjusted under 35 U.S.C. 154(b) by 298 days.
This patent is subject to a terminal disclaimer.

(21) Appl. No.: 13/518,033

(22) PCT Filed: Dec. 21, 2010

(86) PCT No.: PCT/IB2010/055991
§ 371 (c)(1),
(2), (4) Date: Jul. 27, 2012

(87) PCT Pub. No.: WO2011/077379
PCT Pub. Date: Jun. 30, 2011

(65) Prior Publication Data
US 2012/0282469 A1 Nov. 8, 2012

(30) Foreign Application Priority Data
Dec. 24, 2009 (FR) .................. 09 59583

(51) Int. Cl.
*C04B 35/565* (2006.01)
*C04B 35/584* (2006.01)
(Continued)

(52) U.S. Cl.
CPC .............. *C04B 35/18* (2013.01); *C04B 35/195* (2013.01); *C04B 35/44* (2013.01); *C04B 35/443* (2013.01); *C04B 35/486* (2013.01); *C04B 35/491* (2013.01); *C04B 35/50* (2013.01); *C04B 35/505* (2013.01); *C04B 35/563* (2013.01); *C04B 35/565* (2013.01); *C04B 35/5611* (2013.01); *C04B 35/5622* (2013.01); *C04B 35/5626* (2013.01); *C04B 35/581* (2013.01); *C04B 35/583* (2013.01); *C04B 35/584* (2013.01); *C04B 35/587* (2013.01); *C04B 35/58014* (2013.01); *C04B 35/591* (2013.01); *C04B 35/597* (2013.01); *C04B 35/62655* (2013.01); *C04B 35/62695* (2013.01); *C04B 35/63416* (2013.01); *C04B 35/63424* (2013.01); *C04B 35/63488* (2013.01); *C01P 2004/51* (2013.01); *C01P 2006/10* (2013.01); *C04B 35/111* (2013.01); *C04B 2235/3201* (2013.01); *C04B 2235/3206* (2013.01); *C04B 2235/3208* (2013.01); *C04B 2235/3217* (2013.01); *C04B 2235/3224* (2013.01); *C04B 2235/3225* (2013.01); *C04B 2235/3227* (2013.01); *C04B 2235/3229* (2013.01); *C04B 2235/3232* (2013.01); *C04B 2235/3244* (2013.01); *C04B 2235/3272* (2013.01); *C04B 2235/3409* (2013.01); *C04B 2235/3418* (2013.01); *C04B 2235/386* (2013.01); *C04B 2235/3817* (2013.01); *C04B 2235/3821* (2013.01); *C04B 2235/3826* (2013.01); *C04B 2235/3839* (2013.01); *C04B 2235/3843* (2013.01); *C04B 2235/3852* (2013.01); *C04B 2235/3865* (2013.01); *C04B 2235/3873* (2013.01); *C04B 2235/3886* (2013.01); *C04B 2235/528* (2013.01); *C04B 2235/5409* (2013.01); *C04B 2235/5427* (2013.01); *C04B 2235/5436* (2013.01); *C04B 2235/5445* (2013.01);
(Continued)

(58) Field of Classification Search
CPC ...... C04B 35/01; C04B 35/10; C04B 35/515; C04B 35/565; C04B 35/58; C04B 35/584; C01P 2004/51; C01P 2004/61; C01P 2006/10
USPC .................................. 428/402–406
See application file for complete search history.

(56) References Cited

U.S. PATENT DOCUMENTS 1,473,853 A * 11/1923 Harty .................. 501/129
2,079,110 A * 5/1937 Logan et al. .......... 501/89
(Continued)

FOREIGN PATENT DOCUMENTS

| EP | 0517437 B1 | 3/1997 |
| JP | H07187805 | 7/1995 |

(Continued)

OTHER PUBLICATIONS

International Search Report dated Apr. 27, 2011.
C.W.Nies et al.: "Effect of Glass-Transition Temperature of Polyethylene Glyco 1-Plasticized Polyvilyl Alkohol on Granule Ompaction", J. Amer. Ceram. Soc., vol. 67, No. 4; Apr. 25, 1984, Apr. 25, 1983, Jan. 23, 1984, pp. 301-304, XP002594691, Chicago, Illinois (USA), whole document.
William J. Walker Jr. et al.: "Influence of Slurry Paremeters on Characteristics of Spray-Dried Granules", J. Am. Ceram. Soc. 82, (7), Jan. 1, 1999, pp. 1711-1719, XP002594692, N.Y. (USA), Part. III; Fig. 1,5,10,13,et 14; Table II.
Stanley J. Lukasiewicz: "Spraying-Drying Ceramic Powders", J. Am. Ceram. Soc., vol. 72, No. 4, Jan. 1, 1989, pp. 617-624, XP002595161. Massachusetts; USA, whole document.
Wu X Kevin et al.: "Acrylic Binder for Dry Pressing Ceramics", American Ceramic Society Bulletin, American Ceramic Society, Columbus, US, vol. 76, No. 1, Jan. 1, 1997, pp. 49-52, XP001539728, ISSN: 0002-7812, whole document.
Garvie RC, Hannink RH, Pascoe RT; Ceramic Steel? Nature; 258:703-4 (1975).
Ondik HM, McMurdie HF; Phase Diagrams for Zirconia and Zirconia Systems, The American Ceramics Society; pp. 100-118 (1998).
(Continued)

*Primary Examiner* — Holly Le
(74) *Attorney, Agent, or Firm* — Cooper Legal Group

(57) ABSTRACT

The invention relates to a granulated powder intended, in particular, for the production of ceramic sintered parts, said powder having the following chemical weight composition, based on dry matter, namely: at least 1% of a first binder having a glass transition temperature less than or equal to 25° C.; 0-4% of an additional binder having a glass transition temperature greater than 25° C.; 0-4% of a temporary additive different from the first binder and the additional binder, the total content of the first binder, the additional binder and the temporary additive being less than 9%; 0-15% of an additive for sintering the ceramic material; at least 2% impurities; and the remainder comprising a ceramic material, and optionally an agent for stabilizing said ceramic material, to make up 100%. According to the invention, the median diameter $D_{50}$ of the powder is between 80 and 130 μm, the percentile $D_{99.5}$ is less than 500 μm and the relative density of the granules is between 30% and 60%.

19 Claims, No Drawings

(51) Int. Cl.

| | | |
|---|---|---|
| *C04B 35/18* | (2006.01) | |
| *C04B 35/591* | (2006.01) | |
| *C04B 35/587* | (2006.01) | |
| *C04B 35/195* | (2006.01) | |
| *C04B 35/44* | (2006.01) | |
| *C04B 35/443* | (2006.01) | |
| *C04B 35/486* | (2006.01) | |
| *C04B 35/491* | (2006.01) | |
| *C04B 35/50* | (2006.01) | |
| *C04B 35/505* | (2006.01) | |
| *C04B 35/56* | (2006.01) | |
| *C04B 35/563* | (2006.01) | |
| *C04B 35/58* | (2006.01) | |
| *C04B 35/581* | (2006.01) | |
| *C04B 35/583* | (2006.01) | |
| *C04B 35/597* | (2006.01) | |
| *C04B 35/626* | (2006.01) | |
| *C04B 35/634* | (2006.01) | |
| *C04B 35/111* | (2006.01) | |

(52) U.S. Cl.
CPC ............... *C04B 2235/5481* (2013.01); *C04B 2235/6562* (2013.01); *C04B 2235/72* (2013.01); *C04B 2235/77* (2013.01); *C04B 2235/96* (2013.01); *Y10T 428/2982* (2015.01)

(56) References Cited

U.S. PATENT DOCUMENTS

| 5,683,481 | A * | 11/1997 | Chatterjee et al. ............ 264/681 |
| 2009/0115084 | A1 | 5/2009 | Moon |
| 2011/0217557 | A1* | 9/2011 | Kimura et al. ............. 428/425.5 |
| 2012/0326361 | A1* | 12/2012 | Bocciarelli et al. ........... 264/678 |
| 2012/0328879 | A1* | 12/2012 | Nahas ........................... 428/402 |

FOREIGN PATENT DOCUMENTS

| JP | 2006-027914 | 2/2006 |
| WO | 89/01923 | 3/1989 |

OTHER PUBLICATIONS

Lukasiewicz SJ; Spray-drying ceramic powders, Journal of the American Ceramic Society; 72[4] 617-24 (1989).
Matsui K; Initial Sintering Mechanism of 3mol% Yttria-doped Zirconia Powder: Effect of Alumina; Tosoh Research and Technology Review, vol. 51 (2007).
Lee EL, Rainforth WM; Ceramic Microstructures, Property Control by Process; 1st ed. pp. 18-21 (1994).
Hannink RHJ, Kelly PM, Muddle BC; Transformation Toughening in Zirconia-Containing Ceramics; Journal of the American Ceramic Society; 83[3]:461-487 (2000).
Whitman DW, Tang X, Cumbers DI, Ibbitson SA; Using Polymer Blends to Fine-Tune Binder Performance; The American Ceramics Society (1995).
Duramax-B-1000 and B1007 data sheets; Rohm and Haas Company, (2002).
Reed JS, Principles of Ceramics Processing, Second Edition, Chapter 12 (1995).
Zusoplast 9002 data sheet (2003).
Tosoh Zirconia Powder advertisement, www.ceramicbulletin.org (Jun. 2001).
Control of Ceramic Particle Properties by Spray Drying; Niro Limited, Powder Technology Division (Jul. 5, 1999).
Reed JS.; Principles of Ceramics Processing, Second Edition, section on Granulation, pp. 386-387 (1995).
English language translation (machine/automatic translation) of the Executive Summary for: Dan Gutknecht, "These Elaboration et caracterisation de mirco-et nano-composites alumine-zircone pour application orthoediue", Oct. 11, 2006, pp. 34-47, retrieved on Jul. 28, 2010.
Y. Mahiat, "La zircone: cette meconnue", Strategie prothetique, fevrier 2006, vol. 6 No. 1, Jan. 1, 2006, pp. 55-66, XP002594690, URL:http://www.eric-veyrat.fr/tropic1/zircone-meconnue.pdf, retrieved on Jul. 28, 2010, whole document.
English language translation (machine/automatic translation) of the summary for: Y. Mahiat, "La zircone: cette meconnue", Strategie prothetique, Feb. 2006, vol. 6 No. 1, retrieved Jul. 28, 2010.
Third Party Observation Correspondence filed in counterpart application EP-2010814704.2, received by EPO on Nov. 27, 2014 and forwarded on Dec. 12, 2014.
English translation of JP Office action in Japanese counterpart application 2012-545514 dated Sep. 19, 2014.

* cited by examiner

POWDER COMPRISING CERAMIC GRANULES AND LOW TG BINDER

TECHNICAL FIELD

The invention relates to a powder comprising ceramic-based granules, to a process for producing such granules and to a sintered part obtained from such granules.

PRIOR ART

In a ceramic-based sintered part, the mechanical strength decreases with the amount of defects in the part and increases with density.

JP8217448 describes a use of zirconia-based granules for increasing the density after sintering and the three-point bending strength. These granules are obtained by spray-drying a slip, the specific gravity of which is regulated between 0.80 and 1.2 g/cm$^3$. This specific gravity is adjusted by vigorous stirring and also through the use of foaming agents or foam inhibitors. The examples also disclose the addition, to the slip, of 3% of an acrylic resin, as percentage of the dry matter. These granules have a diameter of between 0.01 and 0.2 mm, and a median diameter of approximately 60 microns. They allow good mold filling during production of the preform and have an ability to deform under the effect of the shaping pressure, thereby limiting the number of defects present in the preform after pressing.

However, the granules described in JP8217448 are not suitable for the production of parts with large dimensions, and in particular for the production of parts which have a volume greater than 100 cm$^3$. Indeed, the parts with large dimensions obtained from the granules described in JP8217448 can exhibit, after sintering, cracks in their core and also surface defects, mainly flaking defects.

There is a constant need for a powder which makes it possible to produce a sintered part based on a ceramic material having a volume of greater than 100 cm$^3$, in particular of which all the dimensions are greater than 2 cm, with good mechanical performance levels and a high density.

One objective of the invention is to meet this need.

SUMMARY OF THE INVENTION

The invention proposes a powder comprising granules which is intended in particular for the production of ceramic sintered parts, said powder having the following chemical composition by weight, on the basis of the dry matter:
a ceramic material and, optionally, a stabilizer for said ceramic material: to make up 100%;
at least 1.0% of a first binder having a glass transition temperature (Tg) of less than or equal to 25° C.;
0 to 4.0% of an additional binder having a glass transition temperature of greater than 25° C.;
0 to 4.0% of a temporary additive different from a first binder and from an additional binder, the total content of said first binder, of said additional binder and of said temporary additive being less than 9.0%;
0 to 15% of an additive for sintering said ceramic material; less than 2.0% of impurities;
the median diameter $D_{50}$ of the powder being between 80 and 130 μm, the percentile $D_{99.5}$ being less than 500 μm and the relative density of the granules being between 30% and 60%.

Preferably, more than 80%, more than 90%, or even substantially 100% of the granules have a composition in accordance with the composition of the powder.

As will be seen in greater detail in the rest of the description, the inventors have discovered that the specific distribution of the sizes of granules according to the invention makes it possible to obtain excellent mechanical performance levels, provided that the total content of the first binder, of the additional binder and of the temporary additive is limited to less than 9.0%. The inventors have in fact observed that, contrary to the usual practice consisting in increasing the content of binder in proportion to the median diameter, it was advantageous, in the claimed median diameter range, to keep the content of first binder relatively low. In particular, they have discovered that this limitation of the content of first binder limits the appearance of permanent internal defects, i.e. defects not removed during the sintering of the preform obtained by pressing said granules.

The inventors have also observed that, contrary to the usual practice consisting in adding binders which have high glass transition temperatures in order to improve the mechanical strength in the green state, it was advantageous to select binders having a glass transition temperature of less than 25° C. They have in fact observed that this type of binder facilitates the deformation of the granules during the pressing without, however, unacceptably reducing their mechanical strength in the green state.

The use of a binder having a low glass transition temperature is contrary to a technical preconception according to which the mechanical strength in the green state is considered to decrease with the glass transition temperature of the binder.

A powder according to the invention can also comprise one or more of the following optional and preferred characteristics:
The ceramic material is chosen from the group made up of nitrides, carbides, oxides, oxycarbonitrides and mixtures thereof.
Preferably,
the ceramic material is chosen from the group made up of aluminum nitride, boron nitride, silicon nitride, titanium nitride and mixtures thereof, the nitride preferably being silicon nitride, and/or,
the ceramic material is chosen from the group made up of titanium carbide, silicon carbide, tungsten carbide, zirconium carbide and mixtures thereof, the carbide preferably being silicon carbide, and/or,
the ceramic material is chosen from the group made up of
alumina,
zirconia,
zirconia containing a zirconia stabilizer,
a mixture of alumina and zirconia containing a zirconia stabilizer,
yttrium oxide,
cerium oxide,
cerium oxide doped with rare earths,
cerium oxides doped with zirconia,
the spinel $MgAl_2O_4$,
garnets, preferably $Y_3Al_5O_{12}$,
perovskites of formulae $A'B'O_3$, A' preferably being chosen from the group made up of the elements Sr, Ca, Mg, Pb, Ba, La, Ce and mixtures thereof; and B' preferably being chosen from the group made up of the elements Ti, Zr, Hf, Sn, Mn and mixtures thereof,
feldspars, preferably
of formula $XO.Al_2O_3.2SiO_2$, with X chosen from the group made up of the elements of Group 2 (alkaline-earth metals) of the periodic table, and mixtures thereof, of formula X'O.Al$_2$O$_3$.2SiO$_2$, with X' chosen from the group made up of the elements of Group 1 (alkali metals) of the periodic table of elements, and mixtures thereof,
of formula Z$_2$O$_3$.Al$_2$O$_3$.2SiO$_2$, with Z chosen from the group made up of the rare earths, and mixtures thereof,
cordierites, preferably
of formula X'$_2$O.Al$_2$O$_3$.(5/2)SiO$_2$, with X' chosen from the group made up of the elements of Group 1 (alkali metals) of the periodic table of elements, and mixtures thereof,
of formula Z$_2$O$_3$.Al$_2$O$_3$.(5/2)SiO$_2$, with Z chosen from the group made up of the rare earths and mixtures thereof,
and mixtures thereof;
and mixtures thereof.

Preferably, the ceramic material is chosen from the group made up of
alumina,
zirconia containing a zirconia stabilizer chosen from the group made up of Y$_2$O$_3$, Sc$_2$O$_3$, MgO, CaO, CeO$_2$, and mixtures thereof,
a mixture of alumina and zirconia containing a zirconia stabilizer chosen from the group made up of Y$_2$O$_3$, Sc$_2$O$_3$, MgO, CaO, CeO$_2$, and mixtures thereof,
yttrium oxide,
cerium oxide,
cerium oxide doped with a rare earth chosen from the group made up of La$_2$O$_3$, Pr$_2$O$_3$, Sm$_2$O$_3$, Gd$_2$O$_3$ and mixtures thereof, preferably chosen from the group made up of La$_2$O$_3$, Gd$_2$O$_3$ and mixtures thereof,
cerium oxide doped with zirconia,
the spinel MgAl$_2$O$_4$,
perovskites of formula A'B'O$_3$, A' preferably being chosen from the group made up of the elements Sr, Ca, Pb, Ba and mixtures thereof; and B' preferably being chosen from the group made up of the elements Ti, Zr and mixtures thereof, preferably the perovskites (Pb(Zr, Ti)O$_3$ and (Ca, Ba, Sr)TiO$_3$,
feldspars, preferably
of formula XO.Al$_2$O$_3$.2SiO$_2$, with X chosen from the group made up of the elements Mg, Ca, Sr and mixtures thereof,
of formula X'$_2$O.Al$_2$O$_3$.2SiO$_2$, with X' chosen from the group made up of the elements Na, K and mixtures thereof,
of formula La$_2$O$_3$.Al$_2$O$_3$.2SiO$_2$,
and mixtures thereof,
cordierites, preferably
of formula XO.Al$_2$O$_3$.(5/2)SiO$_2$, with X chosen from the group made up of the elements Mg, Ca and mixtures thereof,
of formula X'$_2$O.Al$_2$O$_3$.(5/2)SiO$_2$, with X' chosen from the group made up of the elements Na, K and mixtures thereof,
of formula La$_2$O$_3$.Al$_2$O$_3$.(5/2)SiO$_2$,
and mixtures thereof;
and mixtures thereof.

Preferably, the oxide is chosen from the group made up of alumina and zirconia containing between 2% and 30% of a zirconia stabilizer chosen from the group made up of Y$_2$O$_3$, Sc$_2$O$_3$, MgO, CaO, CeO$_2$, and mixtures thereof, on the basis of the sum of the contents of oxide and of stabilizer, the MgO+CaO content being less than 5%, on the basis of the sum of the contents of oxide and of stabilizer.

The ceramic material is chosen from the group made up of SiAlON and AlON.

The relative density of the granules is between 40% and 50%.

The granules incorporate particles of said ceramic material of which the median diameter ($D_{50}$) is less than 1 µm, preferably less than 0.8 µm, or even less than 0.5 µm.

The first binder has a glass transition temperature of greater than −30° C. and/or less than 20° C., preferably less than 15° C.

The first binder is chosen from amorphous organic polymers, polyacrylic resins, polymers based on pure acrylates, copolymers based on acrylates and styrene, and blends thereof. Preferably, the first binder is chosen from polyacrylic resins, polymers based on pure acrylates, copolymers based on acrylates and styrene, and blends thereof. More preferably, the first binder is chosen from polyacrylic resins, copolymers based on acrylates and styrene, and blends thereof.

Preferably, the ceramic material and/or the first binder and/or the additional binder and/or the temporary additive and/or the additive for sintering the ceramic material are distributed homogeneously within the granules of the powder.

The first binder and/or the additional binder are chosen from polymers not containing inorganic elements.

The content of temporary additive is less than 1%. Preferably, the temporary additive is an organic additive, preferably chosen from dispersants or surfactants, thickeners, antifoaming agents, preservatives, lubricants, and mixtures thereof.

The sintering additive is inorganic.

The content of impurities is less than 1.0%, preferably less than 0.5%, or even less than 0.3%, or even less than 0.1%. Preferably, the impurities are oxides.

The median diameter ($D_{50}$) of the powder is greater than 90 µm and/or less than 120 µm.

The 10 percentile ($D_{10}$) is greater than 40 µm, preferably greater than 50 µm, more preferably greater than 60 µm.

The 90 percentile ($D_{90}$) is less than 300 µm, preferably less than 250 µm, more preferably less than 200 µm.

The 99.5 percentile ($D_{99.5}$) is less than 400 µm, more preferably less than 300 µm.

The ceramic material can in particular be zirconia. The powder according to the invention can then also comprise one or more of the following optional and preferred charateristics:

The stabilizer is chosen from the group made up of Y$_2$O$_3$, Sc$_2$O$_3$ and mixtures thereof, and the content of said stabilizer, on the basis of the sum of the contents by weight of zirconia and of stabilizer, is less than 6.5%.

The stabilizer is chosen from the group made up of MgO, CaO and mixtures thereof, and the content of said stabilizer, on the basis of the sum of the contents by weight of zirconia and of stabilizer, is less than 4%.

The stabilizer is CeO$_2$ and the content of said stabilizer, on the basis of the sum of the contents by weight of zirconia and of stabilizer, is greater than 10% and less than 15%.

The stabilizer is chosen from the group made up of Y$_2$O$_3$, CeO$_2$ and mixtures thereof, and preferably adheres to the relationship 10%≤3.Y$_2$O$_3$+CeO$_2$≤20%, as percentages on the basis of the sum of the contents by weight of zirconia and of stabilizer.

The stabilizer is Y$_2$O$_3$, i.e. the granules comprise only Y$_2$O$_3$ as stabilizer. In particular in this embodiment, the content of Y$_2$O$_3$ is preferably greater than 3%, preferably greater than 4%, preferably greater than 4.5% and/or less than 6.5%, preferably less than 5.5%, on the basis of the sum of the contents by weight of zirconia and of stabilizer.

The granules can comprise stabilized zirconia, or a mixture of particles of stabilized or nonstabilized zirconia and of particles of said stabilizer, or a mixture of particles in which the stabilized or nonstabilized zirconia and said stabilizer are intimately mixed. In one embodiment, the granules comprise particles in which the stabilized or nonstabilized zirconia and the stabilizer are intimately mixed. Preferably, the granules comprise particles in which the zirconia is stabilized, i.e. the stabilizer is in solid solution in the particles of zirconia. Preferably, the granules comprise particles in which the stabilized zirconia and alumina are intimately mixed.

Preferably, the content of stabilizer is between 2% and 20%, as percentages by weight on the basis of the sum of the contents of the oxide concerned and of the stabilizer.

In a first embodiment, the ceramic material is aluminum nitride (AlN) and makes the composition of the dry matter up to 100%, the content of first binder is between 2.5% and 4% as percentages by weight on the basis of the dry matter, the content of impurities is less than 1%, preferably less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a second embodiment, the ceramic material is aluminum nitride (AlN) and makes the composition of the dry matter up to 100%, the content of sintering additive is between 0.5% and 5%, preferably said sintering additive is chosen from the group made up of oxides of rare earths, of the elements of Groups 2, 3 and 4 of the periodic table of elements, and of mixtures thereof; and of nitrides of rare earths, of the elements of Groups 2, 3 and 4 of the periodic table of elements, and of mixtures thereof; preferably, said sintering additive is chosen from the group made up of $Y_2O_3$ and nitrides of the elements Mg, Ca, Ti, Zr, Si, B and mixtures thereof, preferably said sintering additive is chosen from the group made up of $Y_2O_3$ and nitrides of the elements Ti, Si, B and mixtures thereof, the content of first binder is between 2.5% and 4% as percentages by weight on the basis of the dry matter, the content of impurities is less than 1%, preferably less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a third embodiment, the ceramic material is boron nitride (BN) and makes the composition of the dry matter up to 100%, the content of first binder is between 2.5% and 4% as percentages by weight on the basis of the dry matter, the content of impurities is less than 1%, preferably less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a fourth embodiment, the ceramic material is boron nitride (BN) and makes the composition of the dry matter up to 100%, the content of sintering additive is between 0.5% and 5%, preferably said sintering additive is chosen from the group made up of $LaB_6$; of oxides of rare earths, of the elements of Groups 2, 3 and 4 of the periodic table of elements and of mixtures thereof; and of nitrides of rare earths, of the elements of Groups 2, 3 and 4 of the periodic table of elements, and of mixtures thereof; preferably, said sintering additive is chosen from the group made up of $LaB_6$, $Y_2O_3$ and nitrides of the elements Mg, Ca, Ti, Zr, Si, Al and mixtures thereof, preferably said sintering additive is chosen from the group made up of $LaB_6$, $Y_2O_3$ and nitrides of the elements Ti, Si, Al and mixtures thereof, the content of first binder is between 2.5% and 4% as percentages by weight on the basis of the dry matter, the content of impurities is less than 1%, preferably less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a fifth embodiment, the ceramic material is silicon nitride ($Si_3N_4$) and makes the composition of the dry matter up to 100%, the content of first binder is between 2.5% and 4% as percentages by weight on the basis of the dry matter, the content of impurities is less than 1%, preferably less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a sixth embodiment, the ceramic material is silicon nitride ($Si_3N_4$) and makes the composition of the dry matter up to 100%, the content of sintering additive is between 0.5% and 15%, preferably between 0.5% and 5%, preferably, said sintering additive is chosen from the group made up of oxides of rare earths, of the elements of Groups 2, 3 and 4 of the periodic table of elements, and of mixtures thereof; and of nitrides of rare earths, of the elements of Groups 2, 3 and 4 of the periodic table of elements, and of mixtures thereof; preferably, said sintering additive is chosen from the group made up of MgO, $Al_2O_3$, $Y_2O_3$, and nitrides of the elements Mg, Ca, Ti, Zr, Al, B and mixtures thereof; preferably, said sintering additive is chosen from the group made up of MgO, $Al_2O_3$, $Y_2O_3$, and nitrides of one or more elements from Ti, Al, B, and mixtures thereof, the content of first binder is between 2.5% and 4% as percentages by weight on the basis of the dry matter, the content of impurities is less than 1%, preferably less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a seventh embodiment, the ceramic material is titanium nitride (TiN) and makes the composition of the dry matter up to 100%, the content of first binder is between 2.5% and 4%, as percentages by weight on the basis of the dry matter, the content of impurities is less than 1%, preferably less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In an eighth embodiment, the ceramic material is titanium nitride (TiN) and makes the composition of the dry matter up to 100%, the content of sintering additive is between 0.5% and 5%, preferably said sintering additive is chosen from the group made up of oxides of rare earths, of the elements of Groups 2, 3 and 4 of the periodic table of elements, and of mixtures thereof; and of nitrides of rare earths, of the elements of Groups 2, 3 and 4 of the periodic table of elements, and of mixtures thereof; preferably, said sintering additive is chosen from the group made up of nitrides of the elements Mg, Ca, Zr, Al, Si, B and mixtures thereof, preferably said sintering additive is chosen from the group of nitrides of the elements Al, Si, B and mixtures thereof, the content of first binder is between 2.5% and 4% as percentages by weight on the basis of the dry matter, the content of impurities is less than 1%, preferably less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a ninth embodiment, the ceramic material is titanium carbide (TiC) and makes the composition of the dry matter up to 100%, the content of first binder is between 2.5% and 4% as percentages by weight on the basis of the dry matter, the content of impurities is less than 1%, preferably less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a tenth embodiment, the ceramic material is titanium carbide (TiC) and makes the composition of the dry matter up to 100%, the content of sintering additive is between 0.5% and 5%, preferably said sintering additive is chosen from the group made up of oxides of the elements Si, Al and B, of rare earths, of the elements of Groups 2, 3 and 4 of the periodic table of elements, and of mixtures thereof; of nitrides of the elements Si, Al and B, of rare earths, of the elements of Groups 2, 3 and 4 of the periodic table of elements, and of mixtures thereof; and of carbides of the elements Si, Al and B, of rare earths, of the elements of Groups 2, 3 and 4 of the periodic table of elements, and of mixtures thereof; preferably, said sintering additive is chosen from the group of carbides of the elements Si, Al, B, Zr and mixtures thereof, the content of first binder is between 2.5% and 4% as percentages by weight on the basis of the dry matter, the content of impurities is less than 1%, preferably less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In an eleventh embodiment, the ceramic material is silicon carbide (SiC) and makes the composition of the dry matter up to 100%, the content of first binder is between 2.5% and 4% as percentages by weight on the basis of the dry matter, the content of impurities is less than 1%, preferably less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a twelfth embodiment, the ceramic material is silicon carbide (SiC) and makes the composition of the dry matter up to 100%, the content of sintering additive is between 0.5% and 5%, preferably said sintering additive is chosen from the group made up of oxides of the elements Si, Al and B, of rare earths, of the elements of Groups 2, 3 and 4 of the periodic table of elements, and of mixtures thereof; of nitrides of the elements Si, Al and B, of rare earths, of the elements of Groups 2, 3 and 4 of the periodic table of elements, and of mixtures thereof; and of carbides of the elements Si, Al and B, of rare earths, of the elements of Groups 2, 3 and 4 of the periodic table of elements, and of mixtures thereof; preferably, said sintering additive is chosen from the group made up of $Al_2O_3$, $Y_2O_3$, $SiO_2$, and carbides of the elements Al, B, Ti, Zr and mixtures thereof, the content of first binder is between 2.5% and 4% as percentages by weight on the basis of the dry matter, the content of impurities is less than 1%, preferably less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a thirteenth embodiment, the ceramic material is boron carbide ($B_4C$) and makes the composition of the dry matter up to 100%, the content of first binder is between 2.5% and 4% as percentages by weight on the basis of the dry matter, the content of impurities is less than 1%, preferably less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a fourteenth embodiment, the ceramic material is boron carbide ($B_4C$) and makes the composition of the dry matter up to 100%, the content of sintering additive is between 0.5% and 5%, preferably said sintering additive is chosen from the group made up of oxides of the elements Si, Al and B, of rare earths, of the elements of Groups 2, 3 and 4 of the periodic table of elements, and of mixtures thereof; of nitrides of the elements Si, Al and B, of rare earths, of the elements of Groups 2, 3 and 4 of the periodic table of elements, and of mixtures thereof; and of carbides of the elements Si, Al and B, of rare earths, of the elements of Groups 2, 3 and 4 of the periodic table of elements, and mixtures thereof; preferably, said sintering additive is chosen from the group of carbides of the elements Si, Al, Ti, Zr and mixtures thereof, the content of first binder is between 2.5% and 4% as percentages by weight on the basis of the dry matter, the content of impurities is less than 1%, preferably less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a fifteenth embodiment, the ceramic material is zirconium carbide (ZrC) and makes the composition of the dry matter up to 100%, the content of first binder is between 2.5% and 4% as percentages by weight on the basis of the dry matter, the content of impurities is less than 1%, preferably less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a sixteenth embodiment, the ceramic material is zirconium carbide (ZrC) and makes the composition of the dry matter up to 100%, the content of sintering additive is between 0.5% and 5%, preferably said sintering additive is chosen from the group made up of oxides of the elements Si, Al and B, of rare earths, of the elements of Groups 2, 3 and 4 of the periodic table of elements, and of mixtures thereof; of nitrides of the elements Si, Al and B, of rare earths, of the elements of Groups 2, 3 and 4 of the periodic table of elements, and of mixtures thereof; and of carbides of the elements Si, Al and B, of rare earths, of the elements of Groups 2, 3 and 4 of the periodic table of elements, and mixtures thereof; preferably, said sintering additive is chosen from the group of carbides of the elements Si, Al, Ti, B and mixtures thereof, the content of first binder is between 2.5% and 4% as percentages by weight on the basis of the dry matter, the content of impurities is less than 1%, preferably less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a seventeenth embodiment, the ceramic material is tungsten carbide (WC) and makes the composition of the dry matter up to 100%, the content of first binder is between 2.5% and 4% as percentages by weight on the basis of the dry matter, the content of impurities is less than 1%, preferably less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In an eighteenth embodiment, the ceramic material is alumina ($Al_2O_3$) and makes the composition of the dry matter up to 100%, the content of first binder is between 2.5% and 4% as percentages by weight on the basis of the dry matter, the content of impurities is less than 1%, preferably less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a nineteenth embodiment, the ceramic material is alumina ($Al_2O_3$) and makes the composition of the dry matter up to 100%, the content of sintering additive is between 0.02% and 15%, preferably between 0.02% and 1%, preferably said sintering additive is chosen from the group made up of oxides of the element Si, of rare earths, of the elements of Groups 1, 2, 3 and 4 of the periodic table of elements, and mixtures thereof; preferably, said sintering additive is chosen from the group made up of MgO, CaO, BaO, $Na_2O$, $K_2O$, $Y_2O_3$, $TiO_2$, $ZrO_2$ and mixtures thereof, preferably said sintering additive is chosen from the group made up of MgO, $Y_2O_3$, $TiO_2$, $ZrO_2$ and mixtures thereof, the content of first binder is between 2.5% and 4% as percentages by weight on the basis of the dry matter, the content of impurities is less than 1%, preferably less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a twentieth embodiment, the ceramic material is zirconia ($ZrO_2$) and makes the composition of the dry matter up to 100%, the content of zirconia stabilizer, chosen from the group made up of $Y_2O_3$, $Sc_2O_3$, MgO, CaO, $CeO_2$, and mixtures thereof, is between 2% and 20% as percentages by weight on the basis of the sum of the contents of zirconia and of stabilizer, the MgO+CaO content being less than 5% on the basis of the sum of the contents of zirconia and of stabilizer, the content of first binder is greater than 1% as percentage by weight on the basis of the dry matter, the content of additional binder is between 0 and 4% on the basis of the dry matter, the content of temporary additive is between 0 and 4% on the basis of the dry matter, the total content of said first binder, of said additional binder and of said temporary additive is less than 9% as percentage by weight on the basis of the dry matter, the content of alumina is between 0 and 5% as percentages by weight on the basis of the dry matter, the content of impurities is less than 2%, preferably less than 1%, preferably less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a twenty-first particular embodiment, the ceramic material is zirconia ($ZrO_2$) and makes the composition of the dry matter up to 100%, the zirconia stabilizer is $Y_2O_3$, the content of stabilizer is between 4.5% and 5.5%, on the basis of the sum of the contents of zirconia and of stabilizer, the content of alumina is greater than 0.1% and less than 1%, preferably substantially equal to 0.25%, the content of first binder is between 2.5% and 4%, and the content of impurities is less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a twenty-second particular embodiment, the ceramic material is zirconia ($ZrO_2$) and makes the composition of the dry matter up to 100%, the zirconia stabilizer is $CeO_2$, the content of stabilizer is between 10% and 15%, on the basis of the sum of the contents of zirconia and of stabilizer, the content of alumina is greater than 0.1% and less than 1%, preferably substantially equal to 0.25%, the content of first binder is between 2.5 and 4%, and the content of impurities is less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a twenty-third particular embodiment, the ceramic material is zirconia ($ZrO_2$) and makes the composition of the dry matter up to 100%, the zirconia stabilizer is a mixture of $Y_2O_3$ and $CeO_2$, the content of $Y_2O_3$ is between 1% and 2%, on the basis of the sum of the contents of zirconia and of stabilizer, the content of $CeO_2$ is between 11% and 13%, on the basis of the sum of the contents of zirconia and of stabilizer, the content of alumina is greater than 0.1% and less than 1%, preferably substantially equal to 0.25%, the content of first binder is between 2.5% and 4%, and the content of impurities is less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a twenty-fourth embodiment, the ceramic material is zirconia ($ZrO_2$) and makes the composition of the dry matter up to 100%, the content of zirconia stabilizer, chosen from the group made up of $Y_2O_3$, $Sc_2O_3$, MgO, CaO, $CeO_2$, and mixtures thereof, is between 2% and 20% as percentages by weight on the basis of the sum of $ZrO_2$, $Y_2O_3$, $Sc_2O_3$, MgO, CaO and $CeO_2$, the MgO+CaO content being less than 5% on the basis of the sum of $ZrO_2$, $Y_2O_3$, $Sc_2O_3$, MgO, CaO and $CeO_2$, the content of first binder is greater than 1% as percentage by weight on the basis of the dry matter, the content of additional binder is between 0 and 4% on the basis of the dry matter, the content of temporary additive is between 0 and 4% on the basis of the dry matter, the total content of said first binder, of said additional binder and of said temporary additive being less than 9% as percentage by weight on the basis of the dry matter, the content of alumina is between 5% and 50% as percentages by weight on the basis of the dry matter, the content of alumina sintering additive is between 0 and 2% as percentages by weight on the basis of the dry matter, the content of an additional oxide chosen from a manganese oxide, ZnO, $La_2O_3$, SrO, BaO and mixtures thereof is between 0 and 6% as percentages by weight on the basis of the dry matter, the content of impurities is less than 2%, preferably less than 1%, preferably less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a twenty-fifth particular embodiment, the ceramic material is zirconia ($ZrO_2$) and makes the composition of the dry matter up to 100%, the zirconia stabilizer is $Y_2O_3$ and its content is between 4.5% and 5.5% as percentages by weight on the basis of the sum of $ZrO_2$ and $Y_2O_3$, the content of alumina is greater than 15% and less than 25%, preferably substantially equal to 20%, as percentages by weight on the basis of the dry matter, the content of first binder is between 2.5% and 4% as percentages by weight on the basis of the dry matter, the content of lanthanum oxide is greater than 0.2% and less than 0.8%, preferably substantially equal to 0.5%, as percentages by weight on the basis of the dry matter, the content of impurities is less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a twenty-sixth particular embodiment, the ceramic material is zirconia ($ZrO_2$) and makes the composition of the dry matter up to 100%, the zirconia stabilizer is $Y_2O_3$ and its content is between 4.5% and 5.5% as percentages by weight on the basis of the sum of $ZrO_2$ and $Y_2O_3$, the content of alumina is greater than 15% and less than 25%, preferably substantially equal to 20%, as percentages by weight on the basis of the dry matter, the content of first binder is between 2.5% and 4% as percentages by weight on the basis of the dry matter, the content of impurities is less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a twenty-seventh particular embodiment, the ceramic material is zirconia ($ZrO_2$) and makes the composition of the dry matter up to 100%, the zirconia stabilizer is $CeO_2$ and its content is between 10% and 15% as percentages by weight on the basis of the sum of $ZrO_2$ and $CeO_2$, the content of alumina is greater than 15% and less than 25%, preferably substantially equal to 20%, as percentages by weight on the basis of the dry matter, the content of first binder is between 2.5 and 4% as percentages by weight on the basis of the dry matter, and the content of impurities is less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a twenty-eighth particular embodiment, the ceramic material is zirconia ($ZrO_2$) and makes the composition of the dry matter up to 100%, the zirconia stabilizer is a mixture of $Y_2O_3$ and $CeO_2$, the content of $Y_2O_3$ is between 1% and 2% as percentage by weight on the basis of the sum of $ZrO_2$, $Y_2O_3$ and $CeO_2$, the content of $CeO_2$ is between 11% and 13% as percentages by weight on the basis of the sum of $ZrO_2$, $Y_2O_3$ and $CeO_2$, the content of alumina is greater than 15% and less than 25%, preferably substantially equal to 20%, as percentages by weight on the basis of the dry matter, the content of first binder is between 2.5% and 4% as percentages by weight on the basis of the dry matter, the content of impurities is less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a twenty-ninth particular embodiment, the ceramic material is zirconia ($ZrO_2$) and makes the composition of the dry matter up to 100%, the zirconia stabilizer is a mixture of $Y_2O_3$ and $CeO_2$, the content of $Y_2O_3$ is between 1% and 2% as percentage by weight on the basis of the sum of $ZrO_2$, $Y_2O_3$ and $CeO_2$, the content of $CeO_2$ is between 11% and 13% as percentages by weight on the basis of the sum of $ZrO_2$, $Y_2O_3$ and $CeO_2$, the content of alumina is greater than 15% and less than 25%, preferably substantially equal to 20%, as percentages by weight on the basis of the dry matter, the content of additional oxide, preferably a manganese oxide, is between 0.3% and 2% as percentage by weight on the basis of the dry matter, the content of first binder is between 2.5% and 4% as percentage by weight on the basis of the dry matter, the content of impurities is less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a thirtieth embodiment, the ceramic material is yttrium oxide ($Y_2O_3$) and makes the composition of the dry matter up to 100%, the content of first binder is between 2.5% and 4% as percentages by weight on the basis of the dry matter, the content of impurities is less than 1%, preferably less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a thirty-first embodiment, the ceramic material is yttrium oxide ($Y_2O_3$) and makes the composition of the dry matter up to 100%, the content of sintering additive is between 0.1% and 5%, preferably said sintering additive is chosen from the group made up of oxides of rare earths, oxides of the elements of Groups 2, 3 and 4 of the periodic table of elements, $SiO_2$, $Al_2O_3$, and mixtures thereof; preferably, said sintering additive is chosen from the group made up of $Al_2O_3$, $ZrO_2$ and mixtures thereof, the content of first binder is between 2.5% and 4% as percentages by weight on the basis of the dry matter, the content of impurities is less than 1%, preferably less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a thirty-second embodiment, the ceramic material is cerium oxide ($CeO_2$) and makes the composition of the dry matter up to 100%, the content of first binder is between 2.5% and 4% as percentages by weight on the basis of the dry matter, the content of impurities is less than 1%, preferably less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a thirty-third embodiment, the ceramic material is a cerium oxide doped with rare earths, and makes the composition of the dry matter up to 100%, preferably a cerium oxide doped with rare earths chosen from the group made up of $La_2O_3$, $Pr_2O_3$, $Sm_2O_3$, $Gd_2O_3$ and mixtures thereof, preferably chosen from the group made up of $La_2O_3$, $Gd_2O_3$ and mixtures thereof, the content of first binder is between 2.5% and 4% as percentages by weight on the basis of the dry matter, the content of impurities is less than 1%, preferably less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a thirty-fourth embodiment, the ceramic material is a cerium oxide doped with zirconia and makes the composition of the dry matter up to 100%, the content of first binder is between 2.5% and 4% as percentages by weight on the basis of the dry matter, the content of impurities is less than 1%, preferably less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a thirty-fifth embodiment, the ceramic material is the spinel $MgAl_2O_4$ and makes the composition of the dry matter up to 100%, the content of first binder is between 2.5% and 4% as percentages by weight on the basis of the dry matter, the content of impurities is less than 1%, preferably less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a thirty-sixth embodiment, the ceramic material is a garnet and makes the composition of the dry matter up to 100%, preferably $Y_3Al_2O_{12}$, the content of first binder is between 2.5% and 4% as percentages by weight on the basis of the dry matter, the content of impurities is less than 1%, preferably less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a thirty-seventh embodiment, the ceramic material is a perovskite of formula A'B'O$_3$ and makes the composition of the dry matter up to 100%, A' preferably being chosen from the group made up of the elements Sr, Ca, Mg, Pb, Ba, La, Ce and mixtures thereof, preferably chosen from the group made up of the elements Sr, Ca, Pb, Ba and mixtures thereof; and B' preferably being chosen from the group made up of the elements Ti, Zr, Hf, Sn, Mn and mixtures thereof, preferably chosen from the group made up of the elements Ti, Zr and mixtures thereof, preferably said perovskite is (Pb(Zr, Ti)O$_3$ and (Ca, Ba, Sr)TiO$_3$, the content of first binder is between 2.5% and 4% as percentages by weight on the basis of the dry matter, the content of impurities is less than 1%, preferably less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a thirty-eighth embodiment, the ceramic material is a feldspar and makes the composition of the dry matter up to 100%, preferably of formula $XO.Al_2O_3.2SiO_2$, with X chosen from the group made up of the elements of Group 2 (alkaline-earth metals) of the periodic table and of mixtures thereof, preferably with X chosen from the group made up of the elements Mg, Ca, Sr and mixtures thereof, and/or a feldspar of formula $X'_2O.Al_2O_3.2SiO_2$, with X' chosen from the group made up of the elements of Group 1 (alkali metals) of the periodic table of elements and mixtures thereof, preferably with X' chosen from the group made up of the elements Na, K and mixtures thereof and/or a feldspar of formula $Z_2O_3.Al_2O_3.2SiO_2$, with Z chosen from the group made up of the rare earths, preferably $La_2O_3.Al_2O_3.(5/2)SiO_2$, the content of first binder is between 2.5% and 4% as percentages by weight on the basis of the dry matter, the content of impurities is less than 1%, preferably less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a thirty-ninth embodiment, the ceramic material is a cordierite and makes the composition of the dry matter up to 100%, preferably of formula $XO.Al_2O_3.(5/2)SiO_2$, with X chosen from the group made up of the elements of Group 2 (alkaline-earth metals) of the periodic table and of mixtures thereof, preferably with X chosen from the group made up of the elements Mg, Ca and mixtures thereof, and/or a cordierite of formula $X'_2O.Al_2O_3.(5/2)SiO_2$, with X' chosen from the group made up of the elements of Group 1 (alkali metals) of the periodic table of elements and mixtures thereof, preferably with X' chosen from the group made up of the elements Na, K and mixtures thereof and/or a cordierite of formula $Z_2O_3.Al_2O_3.(5/2)SiO_2$, with Z chosen from the group made up of the rare earths and mixtures thereof, preferably $La_2O_3.Al_2O_3.2SiO_2$, the content of first binder is between 2.5% and 4% as percentages by weight on the basis of the dry matter, the content of impurities is less than 1%, preferably less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a fortieth embodiment, the ceramic material is an oxycarbonitride and makes the composition of the dry matter up to 100%, and is preferably chosen from the group made up of SiAlON and AlON, the content of first binder is between 2.5% and 4% as percentages by weight on the basis of the dry matter, the content of impurities is less than 1%, preferably less than 0.5%, preferably less than 0.1%, as percentages by weight on the basis of the dry matter, and the residual moisture content is between 0.2% and 1%, preferably between 0.2% and 0.6%, as percentages by weight on the basis of the wet powder.

In a forty-first embodiment, the content of additional binder is between 0.5% and 1%, as percentage by weight on the basis of the dry matter. This embodiment can be combined with any one of the abovementioned embodiments.

In a forty-second embodiment, the content of temporary additive is between 0.5% and 1%, as percentage by weight on the basis of the dry matter. This embodiment can be combined with any one of the abovementioned embodiments.

Preferably, a powder according to the invention is produced by spray-drying a slip, preferably according to a process comprising steps a) to d) described hereinafter.

Such a process advantageously makes it possible to produce granules having a relative density of less than 60%, or even less than 50%.

The invention also relates to a process for producing a sintered part, comprising the following steps:
A) mixing raw materials so as to form a starting charge,
B) forming said starting charge so as to obtain a preform,
C) optionally, machining said preform,
D) sintering said preform so as to obtain said sintered part,
E) optionally, machining and/or rectifying said sintered part, this process being noteworthy in that the starting charge comprises a powder comprising granules in accordance with the invention.

The invention also relates to a preform obtained by carrying out a process comprising at least the steps A) and B), or even C), of a production process according to the invention.

The invention also relates to a ceramic sintered part obtained by sintering of an optionally machined preform, according to the invention. In particular, all the dimensions of the sintered part can be greater than 2 cm.

DEFINITIONS

The term "ceramic material" is intended to mean a nonmetallic inorganic material.

The term "binder" is intended to mean a constituent which, in a suitable amount, makes it possible, during a granulation operation, to form granules exhibiting, after drying, a cohesion which allows them to be handled, for example to be transferred from one container to another or to be poured into a mold (in particular under industrial conditions), without breaking. Preferably, this cohesion is at least that obtained with a polymer binder. The granulation operation is not limiting and comprises in particular spray-drying or the use of a granulator. The invention is not therefore limited to granules produced by spray-drying.

The term "sintering additive" for sintering a ceramic material is intended to mean conventionally a constituent which facilitates the sintering of said ceramic material, for example by reducing the temperature required for said sintering, by improving the densification or by limiting crystal growth.

The term "temporary additive" is intended to mean a constituent which can be removed when it is subjected to a temperature greater than or equal to 1000° C., for example during a sintering operation at a temperature greater than or equal to 1000° C.

A precursor of a constituent is a compound capable, during sintering of a preform obtained from a powder according to the invention, of resulting in this constituent. The replacing of a constituent with an "equivalent" amount of a precursor of this constituent does not modify the amounts of said constituent in the sintered product obtained by sintering a powder according to the invention.

The term "impurities" is intended to mean the unavoidable constituents involuntarily and necessarily introduced with the raw materials or resulting from reactions with these constituents. The impurities are not necessary constituents, but only tolerated constituents.

The term "granule" is intended to mean an agglomerate of particles, said agglomerate exhibiting a sphericity index of greater than 0.6, i.e. being provided in a substantially spherical form.

The term "sphericity index" of a granule is intended to mean the ratio between its smallest diameter and its largest diameter, the diameters being measured on images taken, for example, by optical microscopy at a magnification of ×10.

The term "loose packed density" of a powder comprising granules is intended to mean the ratio equal to the weight of a known volume of said powder divided by said volume, the volume being filled by free fall of the powder, while avoiding vibrations. The loose packed density is determined according to standard NF EN 725-9 and is expressed in $g/cm^3$.

The term "absolute density" of a powder comprising granules is conventionally intended to mean the ratio equal to the weight of dry matter of said powder after grinding to a fineness such that substantially no closed pore remains, divided by the volume of this weight after grinding. It can be measured by helium pycnometry.

The term "relative loose packed density" of a powder comprising granules is intended to mean the ratio equal to the loose packed density divided by the absolute density, expressed as a percentage.

The term "true density" of a powder comprising granules is intended to mean the mean of the bulk densities of each granule of this powder.

The term "bulk density" of a granule is conventionally intended to mean the ratio equal to the weight of the granule divided by the volume which said granule occupies.

The term "relative density" of a powder comprising granules is intended to mean the ratio equal to the true density divided by the absolute density, expressed as a percentage.

The term "glass transition temperature" of a binder is conventionally intended to mean the middle of the range of temperatures, termed "transition range", in which said binder gradually becomes more viscous and changes from the liquid state to the solid state. The glass transition temperature can be determined by differential scanning calorimetry (DSC). A list of glass transition temperatures of the main families of polymers is given in the work Polymer Handbook (4th Edition) 1999; 2005 John Wiley & Sons. The amplitude of a transition range is conventionally from approximately 5 to 10° C.

The 10 ($D_{10}$), 50 ($D_{50}$) and 90 ($D_{90}$) percentiles or "centiles" of a powder are the particle sizes corresponding to the percentages, by weight, of 10%, 50% and 90% respectively, on the cumulative particle size distribution curve of the particle sizes of the powder, the particle sizes being categorized by increasing order. For example, 10%, by weight, of the granules of a powder have a size of less than $D_{10}$ and 90% of the granules, by weight, have a size greater than $D_{10}$. The sizes and the percentiles can be determined by means of a particle size distribution produced using a laser particle size analyzer. The 50 percentile ($D_{50}$) is also conventionally called "median diameter".

The term "organic constituent" is conventionally intended to mean a constituent containing only the elements carbon, oxygen, nitrogen and hydrogen.

In a source of zirconia particles, $HfO_2$ cannot be separated chemically from $ZrO_2$. The term "$ZrO_2$" therefore conventionally denotes the total content of these two oxides. According to the present invention, $HfO_2$ is not deliberately added to the starting charge. $HfO_2$ therefore denotes only the traces of hafnium oxide, this oxide always being naturally present in the zirconia sources at contents generally less than 5%, or even less than 2%. In the interests of clarity, the content of zirconia and of traces of hafnium oxide can therefore be denoted without distinction by "$ZrO_2+HfO_2$" or by "$ZrO_2$", or also by "content of zirconia".

The term "comprising a" should be understood to mean "comprising at least one", unless otherwise indicated.

"A first binder" (or "an additional binder") does not necessarily correspond to just one compound, but can correspond to a mixture of several compounds, each having a glass transition temperature of less than or equal to 25° C. (or greater than 25° C., respectively). Likewise, a "stabilizer", a "ceramic material" or a "temporary additive" can correspond to mixtures of several compounds, each constituting a ceramic mixture, a stabilizer or a temporary additive, respectively.

Unless otherwise indicated, all the percentages are given on the basis of the weight of the dry powder, with the exception of the percentages relating to the stabilizers. The content of stabilizer of an oxide is in fact conventionally defined, by default, as percentages by weight on the basis of the total content of said oxide and of said stabilizer.

When reference is made to a group in order to identify elements, reference is implicitly made to a group of the periodic table of elements.

The properties of the powder can be evaluated by means of the methods of characterization implemented for the examples.

DETAILED DESCRIPTION

A powder comprising granules according to the invention can be produced by means of a process comprising a step of spray-drying a slip. Such a process can in particular comprise the following steps:
a) preparing a slip by suspending, in a liquid, preferably in water, the various raw materials necessary in order to obtain, at the conclusion of step b), a powder comprising granules according to the invention;
b) spray-drying said slip so as to form granules;
c) optionally, sieving the granules obtained in step b);
d) optionally, drying the granules obtained in step b) or c).

In step a), the raw materials are mixed in a liquid, for example distilled water, so as to form a slip.

In the slip, the content by weight of dry matter can be between 35 and 70%. The content of dry matter in the slip is adjusted such that the relative density of the granules obtained at the conclusion of step b) is between 30% and 60%. An increase in this content is generally accompanied by an increase in the relative density of the granules obtained at the end of step b).

The binders are constituents of the starting charge which make agglomeration possible during the spray-drying.

Conventionally, the production of granules uses binders of PVA or PEG type; the binders of PVA type or the PEGs having a molecular weight of greater than 600 Da do not exhibit a glass transition temperature (Tg) less than or equal to 25° C. The inventors have discovered that the presence of a binder exhibiting a glass transition temperature (Tg) less than or equal to 25° C., or "first binder", promotes deformation of the granules during pressing and reduces the number of defects. It also leads to an improvement of the mechanical properties of the sintered part obtained from the powder according to the invention.

A content of first binder of less than 1% does not, however, result in a quantifiable effect. Preferably, the first binder exhibits a glass transition temperature of greater than −30° C., preferably greater than −20° C., or even greater than −15° C. and/or less than 20° C., or even less than 15° C.

The first binder can be chosen from polymers. A list of such polymers is disclosed in "Polymer Handbook (4th Edition)", 1999; 2005 John Wiley & Sons. Preferably, the first binder is chosen from amorphous organic polymers and blends thereof. Preferably, the first binder is chosen from polymers based on acrylates (—($CH_2$=CHCOO—)— monomer), which are pure or in the form of copolymers (with styrene monomers, for example) and blends thereof. The polymer may thus be an acrylic resin. Preferably, the first binder is chosen from polymers based on pure acrylates (—($CH_2$=CHCOO—)— monomer), copolymers based on acrylates (—($CH_2$=CHCOO—)— monomer) and on styrene (—($C_8H_8$) monomer) and blends thereof.

Preferably, the first binder is chosen from organic polymers exhibiting, after curing, a breaking strength of greater than 1 N/mm$^2$, or even greater than 5 N/mm$^2$, measured according to standard DIN53455.

Still preferably, the first binder is chosen from organic polymers exhibiting, after curing, an elongation at break of greater than 100%, preferably greater than 200%, or even greater than 500%, measured according to standard DIN53455.

Preferably, the first binder is chosen from polymers not comprising inorganic elements, in particular the elements of Group 1, and especially lithium (Li), sodium (Na) and potassium (K), and also the elements of Group 17, and especially fluorine (F), chlorine (Cl), bromine (Br) and iodine (I). Advantageously, the content of impurities is reduced and the mechanical strength of the sintered parts produced from the powders comprising granules according to the invention is increased.

Preferably, the content of first binder is determined so as to be greater than 2%, preferably greater than 2.5% and/or less than 8%, preferably less than 6%, preferably less than 5%, preferably less than 4%, in the powder produced.

The additional binder is preferably chosen from polymers exhibiting a glass transition temperature greater than 25° C. and less than 100° C., preferably less than 80° C., preferably less than 50° C., or even less than 40° C., and blends thereof.

Preferably, the content of additional binder is less than 3%, more preferably less than 2%, more preferably less than 1% and/or greater than 0.5%.

Preferably, the additional binder is a polymer not comprising inorganic elements, in particular the elements of Groups 1 and 17. Advantageously, the content of impurities is reduced and the mechanical strength of the parts produced from the granules according to the invention is increased.

Preferably, the additional binder is chosen from amorphous organic polymers and blends thereof. Preferably, the additional binder is chosen from alcohol-based compounds. Preferably, the additional binder is chosen from polyvinyl alcohols and polyalkylene glycols, preferably chosen from polyethylene glycols having a molecular weight greater than 600 Da.

A temporary additive can be added during the production of the granules.

The temporary additive is preferably an organic additive, which, according to rules well known to those skilled in the art, can in particular be added in order to facilitate the production of the granules or the forming thereof.

The content of temporary additive is preferably greater than 0.5% and/or less than 1%, the total content of binder(s) and of temporary additive preferably being less than 8%, preferably less than 6%, preferably less than 5%, or even less than 4%, as percentage by weight on the basis of the dry matter. Preferably, the organic additive is chosen from dispersants or surfactants, thickeners, antifoaming agents, preservatives or biocides, lubricants, and mixtures thereof. By way of examples, the dispersants or surfactants can be polyacrylates or ionic or nonionic surfactants, of the family of DOLAPIX products sold by Zschimmer-Schwarz or else DARVAN products or methacrylic acids sold by R.T. Vanderbilt Company. The thickeners can be emulsions of acrylic acids sold by Zschimmer-Schwarz or by BASF. The antifoaming agents can be those of the range sold by Zschimmer-Schwarz. The preservatives or biocides can be quaternary ammonium salts sold by Zschimmer-Schwarz or BASF. The lubricants can be those of the range sold by Zschimmer-Schwarz.

Preferably, the purity of the raw materials is determined in such a way that the content of impurities of a powder comprising granules according to the invention is less than 1%, preferably less than 0.5%, or even less than 0.3%, or even less than 0.1%.

An additive for sintering the ceramic material can be added during the production of the granules so as to guarantee that the granules contain said sintering additive.

In a first particular embodiment, the ceramic material is aluminum nitride and the sintering additive is preferably chosen from the group made up of oxides of rare earths, of the elements of Groups 2, 3 and 4 of the periodic table of elements, and of mixtures thereof, and of nitrides of rare earths, of the elements of Groups 2, 3 and 4 of the periodic table of elements, and of mixtures thereof; preferably, said sintering additive is chosen from the group made up of $Y_2O_3$ and nitrides of the elements Mg, Ca, Ti, Zr, Si, B and mixtures thereof, preferably said sintering additive is chosen from the group made up of $Y_2O_3$ and nitrides of the elements Ti, Si, B and mixtures thereof. Preferably, the content of said sintering additive is between 0.5% and 5%.

In a second particular embodiment, the ceramic material is boron nitride (BN) and the sintering additive is preferably chosen from the group made up of $LaB_6$ and/or oxides of rare earths, of the elements of Groups 2, 3 and 4 of the periodic table of elements and/or nitrides of rare earths, of the elements of Groups 2, 3 and 4 of the periodic table of elements, and mixtures thereof; preferably, said sintering additive is chosen from the group made up of $LaB_6$, $Y_2O_3$ and nitrides of the elements Mg, Ca, Ti, Zr, Si, Al and mixtures thereof, preferably said sintering additive is chosen from the group made up of $LaB_6$, $Y_2O_3$ and nitrides of the elements Ti, Si, Al and mixtures thereof. Preferably, the content of said sintering additive is between 0.5% and 5%.

In a third particular embodiment, the ceramic material is silicon nitride ($Si_3N_4$) and the sintering additive is preferably chosen from the group made up of oxides of rare earths, of the elements of Groups 2, 3 and 4 of the periodic table of elements, and of mixtures thereof, and nitrides of rare earths, of the elements of Groups 2, 3 and 4 of the periodic table of elements, and of mixtures thereof; preferably, said sintering additive is chosen from the group made up of MgO, $Al_2O_3$, $Y_2O_3$, and nitrides of the elements Mg, Ca, Ti, Zr, Al, B and mixtures thereof, preferably said sintering additive is chosen from the group made up of MgO, $Al_2O_3$, $Y_2O_3$, and nitrides of the elements Ti, Al, B and mixtures thereof. Preferably, the content of said sintering additive is between 0.5% and 15%, preferably between 0.5% and 5%.

In a fourth particular embodiment, the ceramic material is titanium nitride (TiN) and the sintering additive is preferably chosen from the group made up of oxides of rare earths, of the elements of Groups 2, 3 and 4 of the periodic table of elements, and of mixtures thereof; and of nitrides of rare earths, of the elements of Groups 2, 3 and 4 of the periodic table of elements, and of mixtures thereof; preferably, said sintering agent is chosen from the group of nitrides of the elements Mg, Ca, Zr, Al, Si, B and mixtures thereof, preferably said sintering additive is chosen from the group of nitrides of the elements Al, Si, B and mixtures thereof. Preferably, the content of said sintering additive is between 0.5% and 5%.

In a fifth particular embodiment, the ceramic material is titanium carbide (TiC) and the sintering additive is preferably chosen from the group made up of oxides of the elements Si, Al and B, of rare earths, of the elements of Groups 2, 3 and 4 of the periodic table of elements, and of mixtures thereof; of nitrides of the elements Si, Al and B, of rare earths, of the elements of Groups 2, 3 and 4 of the periodic table of elements, and of mixtures thereof; and of carbides of the elements Si, Al and B, of rare earths, of the elements of Groups 2, 3 and 4 of the periodic table of elements, and mixtures thereof; preferably, said sintering additive is chosen from the group of carbides of the elements Si, Al, B, Zr and mixtures thereof. Preferably, the content of said sintering additive is between 0.5% and 5%.

In a sixth particular embodiment, the ceramic material is silicon carbide and the sintering additive is preferably chosen from the group made up of oxides of the elements Si, Al and B, of rare earths, of the elements of Groups 2, 3 and 4 of the periodic table of elements, and of mixtures thereof; of nitrides of the elements Si, Al and B, of rare earths, of the elements of Groups 2, 3 and 4 of the periodic table of elements, and of mixtures thereof; and of carbides of the elements Si, Al and B, of rare earths, of the elements of Groups 2, 3 and 4 of the periodic table of elements, and mixtures thereof; preferably, said sintering additive is chosen from the group made up of $Al_2O_3$, $Y_2O_3$, $SiO_2$, and carbides of the elements Al, B, Ti, Zr and mixtures thereof. Preferably, the content of said sintering additive is between 0.5% and 5%.

In a seventh particular embodiment, the ceramic material is boron carbide and the sintering additive is preferably chosen from the group made up of oxides of the elements Si, Al and B, of rare earths, of the elements of Groups 2, 3 and 4 of the periodic table of elements, and of mixtures thereof; of nitrides of the elements Si, Al and B, of rare earths, of elements of Groups 2, 3 and 4 of the periodic table of elements, and of mixtures thereof; and of carbides of the elements Si, Al and B, of rare earths, of the elements of Groups 2, 3 and 4 of the periodic table of elements, and mixtures thereof; preferably, said sintering additive is chosen from the group of carbides of the elements Si, Al, Ti, Zr and mixtures thereof. Preferably, the content of said sintering additive is between 0.5% and 5%.

In an eighth particular embodiment, the ceramic material is zirconium carbide and the sintering additive is preferably chosen from the group made up of oxides of the elements Si, Al and B, of rare earths, of the elements of Groups 2, 3 and 4 of the periodic table of elements, and of mixtures thereof; of nitrides of the elements Si, Al and B, of rare earths, of the elements of Groups 2, 3 and 4 of the periodic table of elements, and of mixtures thereof; and of carbides of the elements Si, Al and B, of rare earths, of elements of groups 2, 3 and 4 of the periodic table of elements, and mixtures thereof; preferably, said sintering additive is chosen from the group of carbides of the elements Si, Al, Ti, B and mixtures thereof. Preferably, the content of said sintering additive is between 0.5% and 5%.

In a ninth particular embodiment, the ceramic material is alumina and the sintering additive is preferably chosen from the group made up of oxides of the element Si, of rare earths, of the elements of Groups 1, 2, 3 and 4 of the periodic table of elements, and mixtures thereof; preferably, said sintering additive is chosen from the group made up of MgO, CaO, BaO, $Na_2O$, $K_2O$, $Y_2O_3$, $TiO_2$, $ZrO_2$ and mixtures thereof, preferably said additive is chosen from the group made up of MgO, $Y_2O_3$, $TiO_2$, $ZrO_2$ and mixtures thereof. Preferably, the content of said sintering additive is between 0.02% and 15%, preferably between 0.02% and 1%.

In a tenth particular embodiment, the ceramic material is zirconia and the sintering additive is preferably alumina. Preferably, the content of alumina is greater than 0.1%, preferably greater than 0.2% and/or less than 5%, preferably less than 2%, preferably less than 1%, more preferably less than 0.6%.

In an eleventh particular embodiment, the ceramic material is a mixture of zirconia containing a zirconia stabilizer chosen from the group made up of $Y_2O_3$, $Sc_2O_3$, MgO, CaO, $CeO_2$, and mixtures thereof, and of alumina; and the alumina sintering additive is chosen from titanium oxide, lanthanum oxide and mixtures thereof. Preferably, the alumina sintering additive is lanthanum oxide. Preferably, the content of alumina sintering additive is greater than 0.2% and/or less than 1%, preferably less than 0.8%.

In a twelfth particular embodiment, the ceramic material is yttrium oxide and the sintering additive is preferably chosen from the group made up of oxides of rare earths, oxides of the elements of Groups 2, 3 and 4 of the periodic table of elements, $SiO_2$, $Al_2O_3$, and mixtures thereof; preferably, said sintering additive is chosen from the group made up of $Al_2O_3$, $ZrO_2$ and mixtures thereof. Preferably, the content of said sintering additive is between 0.1% and 5%.

The content of additive for sintering the ceramic material is preferably greater than 0.02%, preferably greater than 0.1%, or even greater than 0.5% and/or less than 10%, or even less than 5%, or even less than 4%, or even less than 3%, or even less than 2%, or even less than 1%, as percentage by weight on the basis of the dry matter.

The powders comprising sintering additive can also be replaced, at least partially, with powders comprising precursors of these sintering additives, introduced in equivalent amounts.

In one particular embodiment, the granules do not comprise sintering additive.

Preferably, the raw materials are chosen in such a way that the granules do not comprise any constituent other than the ceramic material, the binders, the temporary additive, the sintering additive, the residual moisture and the impurities.

Preferably, the powders comprising the ceramic material and comprising sintering additive are introduced before the binder(s) and the optional temporary additive.

Each of the various raw materials for the granules, in particular each of the powders comprising ceramic material, preferably has a median diameter of less than 50 μm, preferably less than 20 μm, preferably less than 10 μm, and/or a specific surface area of preferably less than 30 m$^2$/g, preferably less than 20 m$^2$/g.

At the end of step a), the dry matter of the slip prepared preferably has a median diameter of less than 1 μm, preferably less than 0.5 μm, more preferably less than 0.3 μm, and a specific surface area of greater than 5 m$^2$/g, preferably greater than 6 m$^2$/g and/or less than 30 m$^2$/g, preferably less than 20 m$^2$/g.

To this effect, in particular if the raw materials do not have a suitable median diameter and/or a suitable specific surface area, the slip is preferably dispersed or ground according to methods well known to those skilled in the art, for example by passing the slip through a mill, preferably an attrition mill. This step advantageously makes it possible to obtain good homogeneity of the various compounds of the desired powder at the end of step a). In particular, this step results in a substantially homogeneous distribution of the first binder in the granules of the powder.

If step a) contains a grinding operation, the optional additional binder and the optional temporary additive, and also the first binder, are preferably introduced after this step.

In step b), the spray-drying results in particles having a low relative density, between 30% and 60%, unlike processes such as rolling granulation or drip casting, which conventionally result in high relative densities.

Preferably, the spray-drying is carried out in such a way that the granules contain residual moisture, the moisture content preferably being less than 1%, preferably less than 0.6%, and/or greater than 0.2%, as percentage by weight on the basis of the wet powder. Advantageously, a residual moisture content of greater than 0.2% contributes to the deformation of the granules under the effect of pressure. However, a residual moisture content of greater than 1% can lead to an increase in the number of surface defects of the preforms produced by pressing starting from a powder comprising granules according to the invention, for example subsequent to adhesion of the preforms to the walls of the molds used for the pressing.

More than 80% by number, preferably more than 90% by number, of the granules exhibit a sphericity index of greater than 0.6, preferably greater than 0.7, preferably greater than 0.8, preferably greater than 0.9.

In step c), the optional sieving is preferably carried out using a sieve with an opening of less than 500 μm, or even less than 400 μm. Advantageously, this step makes it possible to remove the coarsest granules, which may be of use in certain applications.

In step d), the optional drying is preferably carried out at a temperature of between 80° C. and 110° C., for a period of time of preferably greater than 2 hours.

Preferably, the process does not comprise step d).

The inventors have noted that a powder according to the invention can have the following properties:

The relative density of the granules is preferably greater than 40% and/or less than 50%.

The relative loose packed density of the powder is greater than 25% and/or less than 30%.

The flowability of the powder is greater than 1 g/s, preferably greater than 1.5 g/s, preferably greater than 2 g/s.

Thus, according to the invention, a powder comprising aluminum nitride (AlN) granules can have a loose packed density of between 0.7 and 0.95 g/cm$^3$, a powder comprising boron nitride (BN) granules can have a loose packed density of between 0.6 and 1.0 g/cm$^3$, a powder comprising silicon nitride (Si$_3$N$_4$) granules can have a loose packed density of between 0.7 and 0.95 g/cm$^3$, a powder comprising titanium nitride (TiN) granules can have a loose packed density of between 0.7 and 0.95 g/cm$^3$, a powder comprising titanium carbide (TiC) granules can have a loose packed density of between 1.2 and 1.5 g/cm$^3$, a powder comprising silicon carbide (SiC) granules can have a loose packed density of between 0.75 and 0.95 g/cm$^3$, a powder comprising boron carbide (B$_4$C) can have a loose packed density of between 0.6 and 0.75 g/cm$^3$, a powder comprising zirconium carbide (ZrC) granules can have a loose packed density of between 1.65 and 2.0 g/cm$^3$, a powder comprising alumina (Al$_2$O$_3$) granules can have a loose packed density of between 1.0 and 1.2 g/cm$^3$, a powder comprising zirconia (ZrO$_2$) granules can have a loose packed density of greater than 1.4 g/cm$^3$, preferably greater than 1.5 g/cm$^3$, preferably greater than 1.6 g/cm$^3$ and/or less than 1.8 g/cm$^3$, preferably less than 1.7 g/cm$^3$, a powder comprising granules of a mixture of alumina and zirconia (ZrO$_2$) containing between 2% and 20% of a zirconia stabilizer chosen from the group made up of Y$_2$O$_3$, Sc$_2$O$_3$, MgO, CaO and CeO$_2$, as percentages by weight on the basis of the sum of the contents of zirconia and of stabilizer, can have a loose packed density of greater than 1.3 g/cm$^3$, preferably greater than 1.4 g/cm$^3$, preferably greater than 1.5 g/cm$^3$ and/or less than 1.8 g/cm$^3$, preferably less than 1.7 g/cm$^3$, a powder comprising yttrium oxide (Y$_2$O$_3$) granules can have a loose packed density of between 1.25 and 1.5 g/cm$^3$, a powder comprising granules of cerium oxide doped with rare earths can have a loose packed density of between 1.65 and 2.0 g/cm$^3$, a powder comprising granules of the spinel MgAl$_2$O$_4$ can have a loose packed density of between 0.9 and 1.1 g/cm$^3$, a powder comprising the garnet Y$_3$Al$_5$O$_{12}$ can have a loose packed density of between 1.1 and 1.35 g/cm$^3$, a powder comprising the perovskite Pb(Zr, Ti)O$_3$ can have a loose packed density of between 1.7 and 2.25 g/cm$^3$, a powder comprising feldspar can have a loose packed density of between 0.6 and 0.9 g/cm$^3$, a powder comprising cordierite can have a loose packed density of between 0.6 and 0.9 g/cm$^3$.

A powder comprising granules according to the invention can be used for producing a sintered part according to steps A) to E).

Step A) can comprise steps a) and b), or even c) and/or d).

The starting charge can consist of a powder comprising granules according to the invention.

As a variant, the starting charge can comprise a powder comprising granules according to the invention and one or more other powders. Preferably, the powder comprising granules according to the invention represents at least 60%, preferably at least 75%, preferably at least 90%, preferably at least 95% of the weight of the starting charge.

In step B), the forming is preferably carried out by pressing, plastic injection or extrusion, preferably by pressing. Preferably, the pressing is chosen from cold pressing and cold isostatic pressing techniques.

In the case of forming by pressing, the starting charge is poured into a mold and then subjected to a pressure of preferably greater than 80 MPa and preferably less than 200 MPa, or even less than 150 MPa, so as to form a green part or "preform". The granules of the powder according to the invention are efficiently deformed under the effect of this pressure. The preform can then be removed from the mold.

In optional step C), the preform can be machined, according to any technique known to those skilled in the art.

In step D), the preform is sintered, preferably under air, preferably at atmospheric pressure or under pressure (hot pressing or hot isostatic pressing (HIP)) at a temperature between 1000° C. and 2200° C., so as to form a sintered part.

If the preform is produced from a powder comprising granules according to the invention based on aluminum nitride (AlN), the sintering temperature is preferably between 1400° C. and 1750° C., and the atmosphere during the sintering can preferably be inert or partially reducing, preferably an atmosphere under nitrogen.

If the preform is produced from a powder comprising granules according to the invention based on boron nitride (BN), the sintering temperature is preferably between 1700° C. and 2000° C. and the atmosphere during the sintering can preferably be inert or partially reducing, preferably an atmosphere under nitrogen.

If the preform is produced from a powder comprising granules according to the invention based on silicon nitride ($Si_3N_4$), the sintering temperature is preferably between 1600° C. and 1850° C., and the atmosphere during the sintering can preferably be inert or partially reducing, preferably an atmosphere under nitrogen, optionally followed by sintering under argon.

If the preform is produced from a powder comprising granules according to the invention based on titanium nitride (TiN), the sintering temperature is preferably between 1400° C. and 1750° C., and the atmosphere during the sintering can preferably be inert or partially reducing, preferably an atmosphere under nitrogen.

If the preform is produced from a powder comprising granules according to the invention based on titanium carbide (TiC) or on silicon carbide (SiC) or on boron carbide ($B_4C$) or on zirconium carbide (ZrC), the sintering temperature is preferably between 1800° C. and 2200° C., and the atmosphere during the sintering can preferably be inert or partially reducing, preferably an atmosphere under argon.

If the preform is produced from a powder comprising granules according to the invention based on alumina ($Al_2O_3$), the sintering temperature is preferably between 1250° C. and 1700° C.

If the preform is produced from a powder comprising granules according to the invention based on zirconia ($ZrO_2$), the sintering temperature is preferably between 1300° C. and 1500° C., preferably between 1350° C. and 1450° C.

If the preform is produced from a powder comprising granules according to the invention based on alumina and zirconia containing between 2% and 20% of a zirconia stabilizer chosen from the group made up of $Y_2O_3$, $Sc_2O_3$, MgO, CaO and $CeO_2$, in percentages by weight on the basis of the sum of the contents of zirconia and of stabilizer, the sintering temperature is preferably between 1400° C. and 1600° C., preferably between 1450° C. and 1550° C.

If the preform is produced from a powder comprising granules according to the invention based on yttrium oxide ($Y_2O_3$), the sintering temperature is preferably between 1400° C. and 1700° C.

If the preform is produced from a powder comprising granules according to the invention based on cerium oxide ($CeO_2$), the sintering temperature is preferably between 1300° C. and 1500° C.

If the preform is produced from a powder comprising granules according to the invention based on the spinel $MgAl_2O_4$ or the garnet $Y_3Al_5O_{12}$, the sintering temperature is preferably between 1400° C. and 1700° C.

If the preform is produced from a powder comprising granules according to the invention based on perovskite, the sintering temperature is preferably between 1000° C. and 1400° C.

If the preform is produced from a powder comprising granules according to the invention based on feldspar or on cordierite, the sintering temperature is preferably between 1200° C. and 1500° C., said sintering temperature being less than 1400° C. for the cordierites of formula $MgO.Al_2O_3.(5/2)SiO_2$.

Step D) can be a reactive sintering, in particular in order to form SiAlON and AlON.

Steps B) and D) can be carried out in a single step, for example by hot pressing.

In optional step E), the sintered part can be machined, according to any technique known to those skilled in the art.

The powders comprising granules according to the invention can be used in various industrial applications. Said powders can be used to produce sintered parts and/or preforms that will be used in the following applications:

With regard to a powder comprising aluminum nitride granules, the applications can in particular be in the fields of optoelectronics, or of substrates or supports for electronics;

with regard to a powder comprising boron nitride granules, the applications can in particular be in the fields of equipment intended to be used at high temperatures, in particular at temperatures greater than 800° C., of cutting tools or of abrasives;

with regard to a powder comprising silicon nitride granules, the applications can in particular be in the fields of structural ceramics intended for high temperatures, in particular temperatures greater than 800° C., for example gas turbines and engines, of rolling elements, or of cutting or forming tools;

with regard to a powder comprising titanium nitride granules, the applications can in particular be in the fields of cutting tools, of decorative elements, of medical implants;

with regard to a powder comprising titanium carbide granules, the applications can in particular be in the field of cutting tools;

with regard to a powder comprising silicon carbide granules, the applications can be carried out, inter alia, in the fields of cutting tools, of structural ceramics, of elements for motor vehicles, such as brakes, of electrical system elements, such as lightning rods, high-voltage lines, of heating elements, of decorative elements;

with regard to a powder comprising boron carbide granules, the applications can in particular be in the fields of cutting tools, of structural ceramics, of abrasives;

with regard to a powder comprising zirconium carbide granules, the applications can in particular be in the fields of cutting tools, of abrasives, of heating elements;

with regard to a powder comprising alumina granules, the applications can in particular be in the fields of structural ceramics, of abrasives, of refractories, of decorative elements, of transparent materials;

with regard to a powder comprising yttrium oxide granules, the applications can in particular be in the fields of decorative elements, in particular transparent materials;

with regard to a powder comprising granules of cerium oxide, optionally doped with rare earths, the applications can in particular be in the fuel cell fields;

with regard to a powder comprising granules of the spinel MgAl$_2$O$_4$ or of the garnet Y$_3$Al$_5$O$_{12}$, the applications can in particular be in the fields of decorative, in particular transparent, ceramics;

with regard to a powder comprising perovskite granules, the applications can in particular be in the fields of ceramics for electronics, in particular piezoelectric ceramics;

with regard to a powder comprising feldspar or cordierite granules, the applications can in particular be in the fields of insulating ceramics, of refractory ceramics, of saggers.

EXAMPLES

The following nonlimiting examples were produced according to a process comprising steps A) to E) above.

Step A) has the following steps a), b) and c).

In step a), for each of the examples carried out, the alumina powder, the main characteristics of which appear in table 1 below, is dispersed by microgrinding. The magnesia of this alumina powder advantageously serves as a sintering additive.

TABLE 1

| alpha-alumina powder | |
|---|---|
| Al$_2$O$_3$ (% by weight) | Remainder to 100% |
| SiO$_2$ (ppm) | 20 |
| Na$_2$O (ppm) | 50 |
| CaO (ppm) | 20 |
| Fe$_2$O$_3$ (ppm) | 20 |
| MgO (ppm) | 500 |
| TiO$_2$ (ppm) | <20 |
| specific surface area (m$^2$/g) | 9 |
| D$_{10}$ (μm) | 0.2 |
| D$_{50}$ (μm) | 0.3 |
| D$_{90}$ (μm) | 0.9 |

This microgrinding is carried out in a wet bead mill (zirconia beads comprising 3 mol % of Y$_2$O$_3$, with a diameter of 0.8 mm) or an attrition mill. After the microgrinding, the powder has a median diameter equal to 0.3 μm. The dry matter content of the suspension is 50% by weight.

The binders, in the form of 50% by weight solutions, are subsequently added to the suspension.

The slip thus obtained is kept under stirring for 12 hours.

In step b), the slip is subsequently spray-dried on an FSD Minor device sold by the company GEA Niro, with an inlet temperature of the spray dryer of 280° C. and an outlet temperature of the spray dryer of 100° C. At the conclusion of step b), a powder comprising granules is obtained.

In step c), the powder comprising granules is sieved with a 400 μm sieve.

In step B), and for each of the powders comprising granules obtained at the end of step A), the following preforms were produced:

pellets with a diameter of 32 mm and a weight of 8 grams were produced by uniaxial pressing at a pressure of 100 MPa for the measurement of the bulk density, 10 bars having a cross section of 4×5 cm$^2$ and a length of 10 cm were produced by uniaxial pressing at a pressure of 100 MPa for the measurement of the yield, bars having a cross section of 1×1 cm$^2$ and a length of 3 cm were produced by uniaxial pressing at a pressure of 100 MPa for measurement of the 3-point bending.

The preforms thus obtained were not subjected to step C).

In step D), said preforms were sintered according to the following cycle:
rise in temperature to 500° C. at 100° C./h,
hold at 500° C. for 2 hours,
rise in temperature to 1500° C., at 100° C./h,
hold at 1500° C. for 2 hours,
decline in temperature by natural cooling.

In step E), the bars intended for the 3-point bending measurements were machined to the dimensions required for carrying out this measurement (25×10×3 mm$^3$).

The properties of the examples were evaluated according to the following methods of characterization:

The dry matter is measured after drying at 110° C. for at least two hours.

The flowability of a powder comprising granules is measured with a device of "Ford cup" type, according to standard NF EN 658-5. The measurement consists in evaluating the time required for 200 g of powder to flow through a funnel with an internal diameter of 10 mm. The flowability of the powder is then calculated by the ratio equal to the weight of powder divided by the time required for it to flow through the funnel.

The loose packed density of a powder comprising granules is measured with a device of "Ford cup" type, according to standard NF EN 725-9. The measurement consists in evaluating the weight of powder comprising granules that is introduced after filling a container having standard dimensions. The loose packed density is then calculated by giving the ratio of the weight of powder to the volume of the container.

The absolute density of a powder comprising granules is measured by helium pycnometry on an AccuPyc 1330 device from Micromeretics®. The powder comprising granules is calcined beforehand at 500° C. for 2 hours.

The true density of a powder comprising granules is measured by mercury porosimetry on an AutoPores IV 9500 Hg porosimeter device sold by the company Micromeretics®. A weight of 1 gram of powder comprising granules is introduced into the device. After placing under low vacuum for 5 minutes, the mercury is introduced in steps of 3447 Pa (i.e. 0.5 psi). The true density is calculated by:

$$\text{True density} = \frac{\text{weight of powder}}{\text{Total volume} - \text{volume Hg 100 psi}}$$

the total volume being equal to the empty volume of the measurement chamber and the volume Hg 100 psi being the volume of mercury Hg introduced into the chamber in the presence of the powder at a pressure of 0.689 MPa (i.e. 100 psi).

The bulk density of a sintered part is measured on samples with a diameter of 30 mm and a thickness of 3 mm, obtained after pressing, at 100 MPa, of the powder comprising granules according to the example under consideration, and sintered according to the following cycle: rise to 500° C. at a rate of 100° C./h, stationary phase of 2 hours at 500° C., rise to 1500° C. at a rate of 100° C./h, stationary phase of 2 hours at 1500° C., decline to 500° C. at a rate of 200° C./h, then free cooling.

The modulus of rupture is measured on bars of 25×10×3 mm$^3$ machined into parts obtained by pressing, at 100 MPa, of the powder comprising granules according to the example under consideration, and sintered according to the following cycle: rise to 500° C. at a rate of 100° C./h, stationary phase of 2 hours at 500° C., rise to 1500° C. at a rate of 100° C./h, stationary phase of 2 hours at 1500° C., decline to 500° C. at a rate of 200° C./h, then free cooling.

The particle size distributions are determined using a Partica LA-950 laser particle size analyzer sold by the company Horiba. The powder comprising granules is directly introduced into the laser particle size analyzer for the measurement, without being suspended.

The chemical analysis is determined by X-ray fluorescence spectroscopy for the elements of which the content is greater than 0.1% by weight; if the content of an element is less than 0.1% by weight, it is determined by ICP (inductively coupled plasma) on a Vista AX model (sold by the company Varian).

The sphericity index is measured on a Morphologi 3G device sold by the company Malvern Instruments. The powder comprising granules is directly introduced into the device for the measurement. The sphericity index of a granule is determined by the ratio of the smallest diameter to the largest diameter, measured on an image of the granule taken by optical microscopy at a magnification of ×10. In order to measure the percentage of granules exhibiting a predetermined sphericity, statistical counting is carried out on the granules observed on 500 to 1000 images.

The modulus of rupture in 3-point bending is measured according to standard NF EN 658-5, on a Lloyd press, with a distance between external supports of 15 mm, on bars with a length equal to 25 mm, with a width equal to 10 mm and with a thickness equal to 3 mm.

The nature and the content of temporary additive and of binder(s), in particular of polymers, are measured by infrared spectroscopy on a Spectrum 400 device sold by Perkin Elmer. The intensity data are recorded over a 4000-1000 cm$^{-1}$ range with a step of 1 cm$^{-1}$. The polymers are identified by comparison with the FTIR (Fourier Transform infrared spectroscopy) data given, for example, in the work "Handbook of Fourier transform Raman and infrared spectra of polymers", A. H. Kuptsov, German Nikolaevich Zhizhin, vol. 45, 1998, Elsevier. The nature and the content of polymers can also be confirmed by other well-known methods, such as liquid chromatography (HPLC) equipped with separation column(s) suitable for the nature and the number of compounds to be separated. A device such as the Surveyor Plus sold by Thermo Scientific, equipped with a Hypersil Gold column with a diameter of 1.9 μm can be employed.

The total content of temporary constituents is determined by the difference between the weight of powder after calcination at 1000° C. and the weight of powder after drying at 110° C., with respect to the total weight after drying.

The production yield corresponds to the percentage of "conforming" sintered parts, i.e. sintered parts exhibiting neither cracks, including in their core, nor surface defects, on the basis of the number of sintered parts produced.

TABLE 2

| | Example | | |
|---|---|---|---|
| | 1 | 2 | 3 |
| Chemical analysis of the granules (% by weight after drying at 110° C. for 2 h) | | | |
| Al$_2$O$_3$ | Remainder to 100 | | |
| MgO | 0.05 | 0.05 | 0.05 |
| binders | 3 | 3 | 3 |
| Impurities | <0.1 | <0.1 | <0.1 |
| Residual moisture after drying for 2 hours at 110° C., as percentage by weight (without prior drying) | | | |
| | 0.4 | 0.4 | 0.4 |
| Binders | | | |
| Acrylic resin (Tg = 10° C.) | 2.5 | — | 2.5 |
| PEG 4000 (Tg = 35° C.) | 0.5 | — | 0.5 |
| PEG 20000 (Tg = 45° C.) | — | 1 | — |
| PVA 95% hydrolyzed (Tg = 70° C.) | — | 2 | — |
| Properties of the powder comprising granules | | | |
| D$_{10}$ (μm) | 30 | 70 | 70 |
| D$_{50}$ (μm) | 60 | 110 | 110 |
| D$_{90}$ (μm) | 100 | 200 | 200 |
| D$_{99.5}$ (μm) | 200 | 300 | 300 |
| Sphericity index | >0.8 | >0.8 | >0.8 |
| Relative density (%) | 40 | 50 | 40 |
| Loose packed density (g/cm$^3$) | 0.9 | 1.1 | 1.1 |
| Flowability (g/s) | 0.5 | 2 | 2 |
| Properties of the sintered part obtained after pressing of the granules and sintering at 1500° C. | | | |
| Bulk density (g/cm$^3$) | 3.96 | 3.70 | 3.96 |
| Modulus of rupture in 3-point bending (MPa) | 380 | 340 | 380 |
| Production yield (%) | 50 | 100 | 100 |

The inventors consider that the ability to fill a mold can be evaluated by the loose packed density of the powder and by its flowability. A high loose packed density and a high flowability value correspond to a good ability to fill a mold.

Table 2 makes it possible to make the following observations:

The powder comprising granules of example 1, using the same binders as the powder of example 3, exhibits a lower loose packed density and a lower flowability value. Its ability to fill a mold is lower than those of the powders of examples 2 and 3. The production yield for parts having dimensions of 10×5×4 cm$^3$ (volume of 200 cm$^3$) is much lower than that obtained with the powder comprising granules of example 3, thereby illustrating the importance of a median diameter D$_{50}$ of greater than 80 μm.

The powder comprising granules of example 2 using binders which do not have a glass transition temperature of less than 25° C. does not make it possible, after pressing and sintering, to obtain a sintered part having a high density and a high modulus of rupture in 3-point bending.

The powder comprising granules of example 3 according to the invention makes it possible to produce, with high yields, sintered parts having a large volume and exhibiting noteworthy mechanical properties.

Of course, the invention is not limited to the embodiments provided by way of examples.

In particular, the bulk density of a sintered part according to the invention is not limiting.

In addition, processes other than spray-drying can be used in order to produce a powder comprising granules according to the invention, for example a process involving a lyophilization step, or a process involving a fluidized bed granulation step, or a step of granulation using a paddle mixer.

The invention claimed is:

1. A powder comprising granules which is intended in particular for the production of ceramic sintered parts, said powder having the following chemical composition by weight, on the basis of the dry matter:
    a ceramic material chosen in the group consisting in silicon carbide, silicon nitride and mixtures thereof, and, optionally, a stabilizer for said ceramic material: to make up 100%;
    at least 1.0% of a first binder having a glass transition temperature of less than or equal to 15° C.;
    0 to 4.0% of an additional binder having a glass transition temperature of greater than 25° C.;
    0 to 4.0% of a temporary additive different from a first binder and from an additional binder, the total content of said first binder, of said additional binder and of said temporary additive being less than 9.0%;
    0 to 15% of an additive for sintering the ceramic material;
    less than 2.0% of impurities;
    the median diameter $D_{50}$ of the powder being between 80 and 130 μm, the percentile $D_{99.5}$ being less than 500 μm, the 10 percentile $D_{10}$ is greater than 40 μm and the relative density of the granules being between 30% and 60%.

2. The powder as claimed in claim 1, in which the content of additional binder is between 0.5% and 1% as percentage by weight on the basis of the dry matter.

3. The powder as claimed in claim 1, in which
    the content of additional binder is between 0.5% and 1% as percentage by weight on the basis of the dry matter, and
    the content of temporary additive is between 0.5% and 1%.

4. The powder as claimed in claim 1, in which the granules incorporate particles of ceramic material of which the median diameter $D_{50}$ is less than 1 μm.

5. The powder as claimed in claim 1, in which the first binder has a glass transition temperature of greater than −30° C.

6. The powder as claimed in claim 1, in which the first binder is chosen from amorphous organic polymers, polyacrylic resins, polymers based on pure acrylates, copolymers based on acrylates and styrene, and blends thereof.

7. The powder as claimed in claim 1, in which the first binder is chosen from polyacrylic resins, polymers based on pure acrylates, copolymers based on acrylates and styrene, and blends thereof.

8. The powder as claimed in claim 1, in which the first binder is chosen from polyacrylic resins, copolymers based on acrylates and styrene, and blends thereof.

9. The powder as claimed in claim 1, in which the first binder and/or the additional binder are chosen from polymers not comprising inorganic elements.

10. The powder as claimed in claim 1, in which said temporary additive is an organic additive, the content of said organic additive being less than 1%, the total content of binder(s) and of organic additive being less than 5%, said organic additive being chosen from dispersants or surfactants, thickeners, antifoaming agents, preservatives, lubricants, and mixtures thereof.

11. The powder as claimed in claim 1, in which
    the median diameter $D_{50}$ is greater than 90 μm and less than 120 μm; and/or
    the 90 percentile $D_{90}$ is less than 300 μm; and/or
    the 99.5 percentile $D_{99.5}$ is less than 400 μm.

12. The powder as claimed in claim 1, in which more than 80% of the granules have said chemical composition.

13. The powder as claimed in claim 1, in which
    the ceramic material is silicon carbide SiC, and
    the content of first binder is between 2.5% and 4% as percentages by weight on the basis of the dry matter, and
    the content of impurities is less than 1% as percentage by weight on the basis of the dry matter, and
    the residual moisture content is between 0.2% and 1% as percentages by weight on the basis of the wet powder.

14. The powder as claimed in claim 1, in which
    the ceramic material is silicon carbide SiC, and
    the content of sintering additive is between 0.5 and 5%, said sintering additive being chosen from the group made up of oxides of the elements Si, Al and B, of rare earths, of the elements of Groups 2, 3 and 4 of the periodic table of elements, and of mixtures thereof; of nitrides of the elements Si, Al and B, of rare earths, of the elements of Groups 2, 3 and 4 of the periodic table of elements, and of mixtures thereof; and of carbides of the elements Si, Al and B, of rare earths, of the elements of Groups 2, 3 and 4 of the periodic table of elements, and of mixtures thereof, and
    the content of first binder is between 2.5% and 4% as percentages by weight on the basis of the dry matter, and
    the content of impurities is less than 1% as percentage by weight on the basis of the dry matter, and
    the residual moisture content is between 0.2% and 1% as percentages by weight on the basis of the wet powder.

15. The powder as claimed in claim 14, in which the sintering additive is chosen from the group made up of $Al_2O_3$, $Y_2O_3$, $SiO_2$, and carbides of the elements Al, B, Ti, Zr and mixtures thereof.

16. The powder as claimed in claim 1, in which
    the ceramic material is silicon nitride $Si_3N_4$, and
    the content of first binder is between 2.5% and 4% as percentages by weight on the basis of the dry matter, and
    the content of impurities is less than 1% as percentage by weight on the basis of the dry matter, and
    the residual moisture content is between 0.2% and 1% as percentages by weight on the basis of the wet powder.

17. The powder as claimed in claim 1, in which
    the ceramic material is silicon nitride $Si_3N_4$, and
    the content of sintering additive is between 0.5 and 15%, said sintering additive being chosen from the group made up of oxides of rare earths, of the elements of Groups 2, 3 and 4 of the periodic table of elements, and of mixtures thereof; and of nitrides of rare earths, of the elements of Groups 2, 3 and 4 of the periodic table of elements, and of mixtures thereof, and
    the content of first binder is between 2.5% and 4% as percentages by weight on the basis of the dry matter, and
    the content of impurities is less than 1% as percentage by weight on the basis of the dry matter, and
    the residual moisture content is between 0.2% and 1% as percentages by weight on the basis of the wet powder.

18. The powder as claimed in claim 17, in which the sintering additive is chosen from the group made up of MgO, $Al_2O_3$, $Y_2O_3$, and nitrides of the elements Mg, Ca, Ti, Zr, Al, B and mixtures thereof.

19. A process for producing a sintered part, comprising the following steps:
    A) mixing raw materials so as to form a starting charge comprising a powder comprising granules as claimed in claim 1, said powder comprising granules representing at least 60% of the weight of the starting charge,
    B) forming a preform from said starting charge,
    C) optionally, machining said preform,
    D) sintering said preform so as to obtain said sintered part,
    E) optionally, machining and/or precision grinding said sintered part.

* * * * *